UNITED STATES PATENT OFFICE.

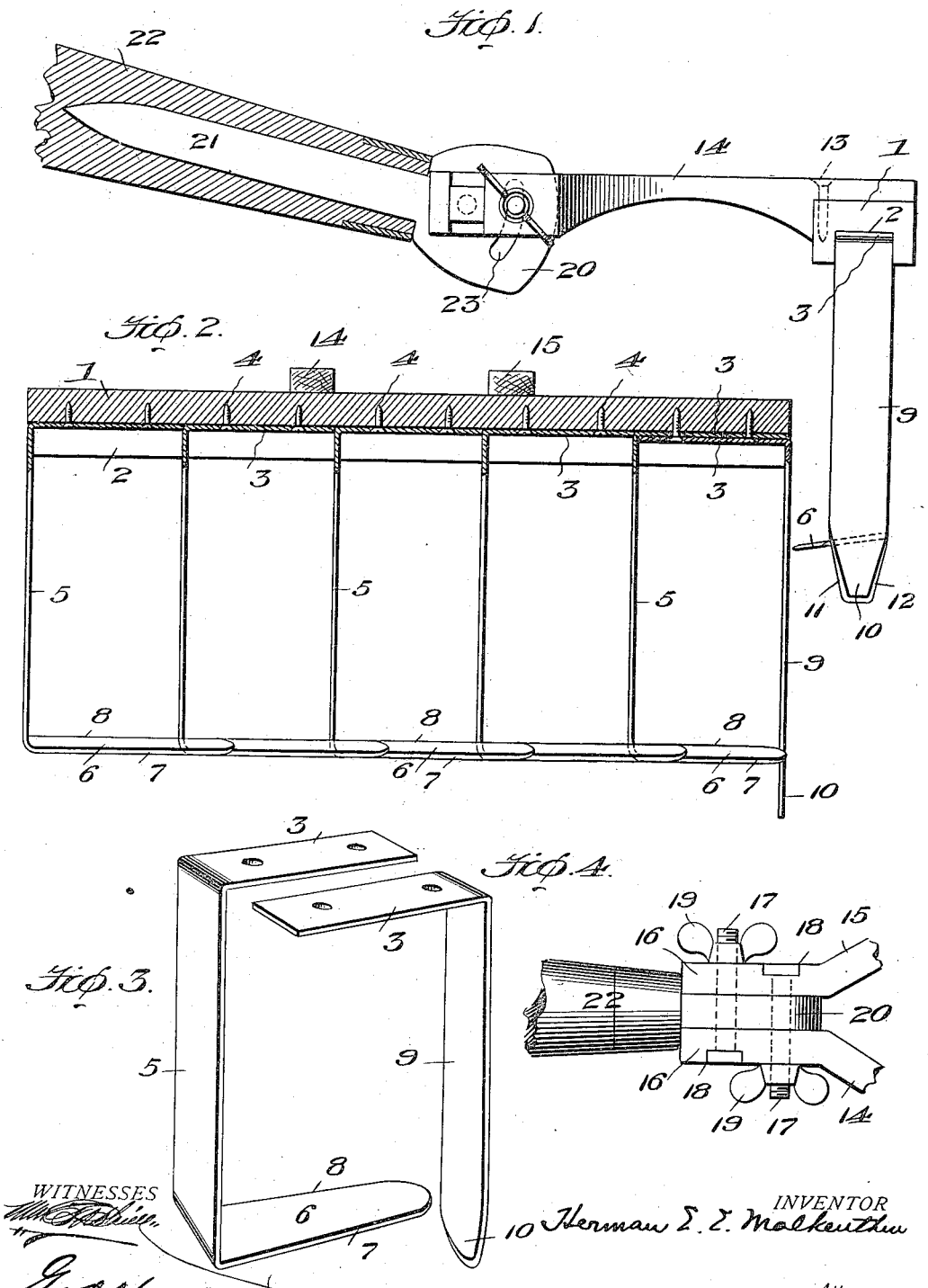

HERMAN E. E. MOLKENTHIN, OF COEUR D'ALENE, IDAHO, ASSIGNOR OF ONE-HALF TO WILLIAM B. MONTI, OF LA CROSSE, WISCONSIN.

COMBINATION AGRICULTURAL IMPLEMENT.

1,080,842.     Specification of Letters Patent.     Patented Dec. 9, 1913.

Application filed December 9, 1912. Serial No. 735,724.

*To all whom it may concern:*

Be it known that I, HERMAN E. E. MOL-KENTHIN, a citizen of the United States, residing at Coeur d'Alene, county of Kootenai, and State of Idaho, have invented certain new and useful Improvements in Combination Agricultural Implements, of which the following is a specification.

This invention relates to combination agricultural implements.

My object is to provide in one simple, strong, durable and inexpensive implement a novel hand cultivator, hand rake, and hand weeder and a handle therefor which is preferably, but not necessarily adjustable.

The invention consists of a hand combination rake, weeder and cultivator whose parts are of novel construction and are combined and mounted in an improved manner.

The preferred embodiment of the invention is fully set forth hereinafter and the novel features are recited in the appended claims.

In the accompanying drawings:—Figure 1 is a side elevation with the handle in section; Fig. 2, an end view with the head or bar in section and parts of the connecting members and shanks in section; Fig. 3, a perspective detail of one of the combination teeth and cultivators and the special tooth used at one end of the device; and Fig. 4, a detail of the adjustable connection of the tang.

The head or bar 1 which is preferably of metal has a channel 2. The combination teeth are of metal, either cast or of bent sheet material, each having a connecting member 3 lying in the channel 2 and secured to the head 1 by screws or screws and nuts 4, whereby they may be readily attached or removed in case of breakage or necessity of substitution or for purposes of sharpening. The shank is shown at 5 and the knife at 6, the latter being sharpened on both edges 7 and 8 and lying in general right-angular relation to the shanks 5 so as to be disposed in general horizontal position when in use. The plane of each knife 6 is disposed in somewhat canted or angular relation so that while the general disposition of these knives is parallel to the head 1, they are really somewhat inclined in relation thereto, which enables them to more readily enter the earth when used as a cultivator or to sever the weeds when used as a weeder. The knives 6 overlap each other and lie in substantially the same plane. At one end of the head 1 there is also provided a shank 9 which has no knife 6, but is provided with a tip or point 10 projecting down below the plane of the knives 6 and sharpened at its front and rear edges 11 and 12. The shanks 5 and 9 constitute rake teeth; the knives 6 constitute weeders; and the point 10 and the knives 6 also constitute cultivators, thus adapting the implement to be used as a rake, as a cultivator, or as a weeder. According to the pressure applied to the bar or head 1, the knives 6 will operate above or below the surface of the soil to any depth required and so will the point 10. The complete teeth, being detachably connected by the screws or fastenings 4 to the head 1, whenever a given tooth breaks or becomes damaged or for any reason has to be detached, it can be readily removed without disturbing the remaining teeth. On account of the connecting members 3 being disposed in the channels 2 and fitting the side walls thereof, as also the shanks 5 fitting said side walls, the entire tooth is braced and the strain is taken off the fastenings 4.

Secured by fastenings 13 to the head 1 are the members 14 and 15 which have parallel parts 16 through which extend clamping screws 17, the heads of the bolts of which lie in recesses 18 in the members 16, whereby said bolts are prevented from turning, thus enabling the wing nuts 19 to be tightened or loosened. Pivoted on one of the clamping screws 17 is the head 20 of a tang 21 which is received in a handle 22 of any ordinary construction. The head 20 is provided with an arc-shaped slot 23, through which the other clamping screw 17 passes. The head 20 can, therefore, be turned and clamped where adjusted, both wing nuts being used to tension the members 16 against the head 20 so that the strain is divided between the respective clamping screws. With this construction the handle 22 can be adjusted upwardly or downwardly to any desired position to suit the convenience of the person using the implement and to enable the device to be used as a rake, weeder, or cultivator and operated along the surface of the soil or below its surface at any desired depth.

I do not limit myself to the use of the adjustable handle set forth as the invention is not dependent on this, or any other, adjustable handle and any suitable handle may be provided.

Having thus described my invention, what I claim as new and desire to secure by Letters Patent, is:—

1. In a combination hand agricultural implement, the combination with a head or bar of channel form, of independent earth treating devices having angularly arranged attachment members received in the channel of the bar and independently detachably fastened thereto and provided with downwardly extending shank members, said shank members being provided with knife members arranged laterally in an angular relation to the shank members and overlapping each other in the direction of their length.

2. In a combination hand agricultural implement, the combination with a head or bar, of shanks depending therefrom provided with generally horizontally arranged knives which are disposed in overlapping relation to each other, and an additional shank depending from the bar and provided with a tip extending below the knife members aforesaid.

In testimony whereof, I hereunto affix my signature in presence of two witnesses.

HERMAN E. E. MOLKENTHIN.

Witnesses:
HERMAN HAMBURGER,
C. E. MAGUIRE.

---

Copies of this patent may be obtained for five cents each, by addressing the "Commissioner of Patents, Washington, D. C."